United States Patent
Nagata

Patent Number: 5,923,479
Date of Patent: Jul. 13, 1999

[54] WIDE-ANGLE LENS SYSTEM

[75] Inventor: Tetsuo Nagata, Urawa, Japan

[73] Assignee: Olympus Optical Co., Ltd., Tokyo, Japan

[21] Appl. No.: 09/070,155

[22] Filed: Apr. 30, 1998

[30] Foreign Application Priority Data

Aug. 22, 1997 [JP] Japan ................................... 9-226523

[51] Int. Cl.[6] .............................. G02B 9/00; G02B 13/04; G02B 9/62; G02B 9/04
[52] U.S. Cl. ...................... 359/740; 359/753; 359/761; 359/793
[58] Field of Search ................................... 359/740, 753, 359/749, 761, 770, 781, 793

[56] References Cited

U.S. PATENT DOCUMENTS

| | | | |
|---|---|---|---|
| 4,189,211 | 2/1980 | Taylor | 359/753 |
| 5,148,314 | 9/1992 | Chen | 359/642 |
| 5,691,847 | 11/1997 | Chen | 359/793 |
| 5,774,279 | 6/1998 | Kiriki et al. | 359/753 |

FOREIGN PATENT DOCUMENTS

| | | |
|---|---|---|
| 6-194571 | 7/1994 | Japan . |
| 7-181376 | 7/1995 | Japan . |
| 7-248447 | 9/1995 | Japan . |
| 9-49968 | 2/1997 | Japan . |

*Primary Examiner*—Georgia Epps
*Assistant Examiner*—Evelyn A. Lester
*Attorney, Agent, or Firm*—Pillsbury Madison & Sutro LLP

[57] ABSTRACT

The invention provides an inexpensive wide-angle lens system which is well corrected for longitudinal chromatic aberration and chromatic aberration of magnification without recourse to any anomalous dispersion glass while a long enough back focus is fully ensured. The wide-angle lens system comprises a front lens group comprising at least one positive lens and having negative power as a whole, an aperture stop 10, and a rear lens group comprising at least one negative lens and a diffractive optical element 11 having a diffractive surface of positive power, and having positive power as a whole, and satisfies $0.005 < f/f_{DOE} < 0.03$ where f is a focal length of the wide-angle lens system and $f_{DOE}$ is a focal length of the diffractive surface provided that $f_{DOE}$ is free of power of a substrate.

12 Claims, 10 Drawing Sheets

WIDE-ANGLE LENS SYSTEM

BACKGROUND OF THE INVENTION

The present invention relates generally to a wide-angle lens system well corrected for chromatic aberrations, which is used on an image pickup device, and more particularly to a wide-angle lens system having a back focus long enough to be used on particular cameras such as video cameras or digital cameras.

A conventional image pickup lens system using a solid-state image sensor or the like is required to have a back focus long enough to locate an optical low-pass filter, an infrared cutoff filter and so on between the image pickup lens and the solid-state image sensor. Thus, the phototaking lens system is generally of the retrofocus type comprising a negative front lens group and a positive rear lens group. However, this type of lens system produces much off-axis aberrations such as distortion and astigmatism because the lens power profile or distribution is asymmetric with respect to an aperture stop. Such image pickup lens systems, for instance, are disclosed in JP-A's 63-81309 and 63-81310. However, these image pickup lens systems are less than satisfactory in terms of correction of various aberrations although their back focus are well ensured.

Regarding chromatic aberrations and especially paraxially longitudinal chromatic aberration, positive chromatic aberration is produced at the aforesaid front lens group located nearer to an object side of the system rather than to an aperture stop while negative chromatic aberration is produced at the aforesaid rear lens group located nearer to an image plane of the system rather than to the aperture stop. Regarding chromatic aberrations of magnification, negative chromatic aberration is produced at the front lens group, and negative chromatic aberration is produced at the rear lens group, too. Thus, the longitudinal chromatic aberration can be corrected at the front and rear lens groups, but the chromatic aberration of magnification cannot. To achieve the target performance, therefore, a conventional retrofocus type phototaking lens system is built up of a front lens group and a rear lens group, each comprising a plurality of positive, and negative lenses, whereby the amount of longitudinal chromatic aberration and chromatic aberration of magnification produced is kept small. Such a phototaking lens system uses a cemented lens for correction of the aberrations, as disclosed in JP-A's 7-27973 and 9-49968 for instance. According to the examples given therein, however, some considerable chromatic aberration of magnification is produced. In particular, the chromatic aberration of magnification with respect to the g-line becomes very large toward the periphery of the field angle.

With the recent progress in production technologies, solid-state image sensors are now increasingly miniaturized to one pixel size of the order of a few $\mu$m. With this, phototaking lenses of ever-higher performance are demanded, and it is desired to reduce chromatic aberration of magnification to a very low level in the visible wavelength region. To make good correction for the chromatic aberrations of magnification inclusive of that with respect to the g-line, it is thus required to use anomalous dispersion glasses. Such image pickup lens systems, for instance, are disclosed in JP-A's 5-134174, 7-181376 and 7-248447. In the examples given therein, about two or three anomalous dispersion glasses are used to make correction for chromatic aberrations of magnification inclusive of that with respect to the g-line. However, such anomalous dispersion glasses are expensive, and so phototaking lenses formed of them cost much.

Among recently developed chromatic aberration correcting elements, attention is now paid to a diffractive optical element (DOE for short) harnessing a diffraction phenomenon. Unlike a conventional refractive lens, the DOE is optically characterized by reciprocal dispersion and anomalous dispersion, as expressed by an Abbe's number $v=-3.45$ and a partial dispersion $\theta_{gf}=0.296$. For instance, this is described in an article: Thomas Stone and Nicholas George, "Hybrid diffractive-refractive lenses and achromats", Applied Optics, 27, 14, 2960–2971 (1988.7.15). As well known, this property can be used to cement together a refractive lens of positive power and a DOE of positive weak power, thereby making correction for chromatic aberrations. In recent years, various image pickup lenses have been embodied making use of this DOE property. In the examples of U.S. Pat. No. 5,148,314, for instance, Chungte W. Chen discloses an eyepiece lens, a Petzval type lens, a lens of large aperture, a telephoto lens, etc., and teaches that chromatic aberrations and off-axis aberrations can be corrected by using DOEs in optical systems.

JP-A's 6-331898, 6-331887, 6-347700 and 6-324262, and Publication of the Translation of International Application No. 8-508116, etc. disclose some applications of DOEs to telephoto lenses, objectives, projection lenses, and photographic standard lenses. A typical application of a DOE to a wide-angle lens system is an endoscope objective as disclosed in JP-A 6-194571. This lens-system is a phototaking lens system peculiar to an endoscope objective that produces very considerable distortion although its field angle is wide, and so is unsuitable for the technical field to which the invention belongs.

Never until now is a wide-angle lens system using a DOE to make good correction for monochromatic aberration and chromatic aberrations proposed. Nor is a low-cost yet high-performance wide-angle lens system having a sufficient back focus put forward.

SUMMARY OF THE INVENTION

In view of the aforesaid problems associated with the prior art, it is an object of the invention to provide a wide-angle lens system well corrected for longitudinal chromatic aberration and chromatic aberration of magnification without recourse to any anomalous dispersion glass. Another object of the invention is to provide a wide-angle lens system well corrected for aberrations to the vicinity of the periphery of a field angle while a long back focus is fully ensured.

According to the present invention, these objects are achieved by the provision of a wide-angle lens system which comprises, in order from an object side of said wide-angle lens system, a front lens group comprising at least one positive lens and having negative power as a whole, an aperture stop, and a rear lens group comprising at least one negative lens and a diffractive optical element having a diffractive surface of positive power, and having positive power as a whole, and which satisfies condition (1) given below:

$$0.005 < f/f_{DOE} < 0.03 \tag{1}$$

where f is a focal length of said wide-angle lens system and $f_{DOE}$ is a focal length of said diffractive surface provided that $f_{DOE}$ is free of power of a substrate.

To make good correction for longitudinal chromatic aberration and chromatic aberration of magnification, it is preferable for the wide-angle lens system of the invention to satisfy conditions (2) and (3) given below:

$$-1.5 < f_{DOE}/\nu_1 < 0 \quad (2)$$

$$-0.5 < f_{DOE}/\nu_2 < 0.7 \quad (3)$$

where $\nu_1$ is an equivalent Abbe's number of said front lens group and $\nu_2$ is an equivalent Abbe's number of said rear lens group, provided that said equivalent Abbe's number is a function of a focal length and an Abbe's number of a refractive lens except said diffractive surface, as defined by:

$$1/\nu_i = \sum_j^n \{1/(\nu_{ij} f_{ij})\}$$

where $\nu_{ij}$ is an Abbe's number of a j-th lens in said i-th lens group and $f_{ij}$ is a focal length of the j-th lens in said i-th lens group.

In what follows, a detailed account will be given of why the aforesaid arrangements are used in the invention and how they work.

As already noted, the diffractive surface (DOE for short) having diffractive action is characterized by reciprocal dispersion and anomalous dispersion as expressed by an Abbe's number of −3.453 and a partial dispersion $\theta_{gf}$=0.296. Paraxially, a retrofocus type phototaking lens system can make correction for longitudinal chromatic aberrations because longitudinal chromatic aberrations of opposite signs are produced at the front and rear lens groups. In this case, however, the front and rear lens groups produce negative chromatic aberration of magnification. To make good correction for the chromatic aberration of magnification, it is required to use an element capable of producing positive chromatic aberration of magnification. When a negative lens is used to this end, however, it is required to increase the power of a positive lens correspondingly. This in turn has an adverse influence on off-axis aberrations. On the other hand, the DOE produces a very large positive chromatic aberration of magnification with weak positive power, so that the chromatic aberration of magnification can be reduced to a very low level. In this regard, it is not preferable to use a DOE of positive power in the front lens group because a very large negative longitudinal chromatic aberration is produced. It is thus desired to locate the DOE in the rear lens group. In addition, this DOE, because of being characterized by a partial dispersion $\theta_{gf}$=0.296, enables the chromatic aberrations of magnification inclusive of that with respect to the g-line to be well corrected without recourse to any expensive anomalous dispersion glass.

To make good correction for off-axis aberrations, it is desired to incorporate at least one positive lens in the front lens group. By the incorporation of a positive lens in the front lens group it is possible to make good correction for distortion in particular. It is also desired to incorporate at least one negative lens in the rear lens group. By the incorporation of a negative lens in the rear lens group it is possible to make good correction for spherical aberration, astigmatism and coma in particular. By the incorporation of a negative lens and a positive lens in the front and rear lens groups, respectively, it is possible to reduce chromatic aberrations to a very low level with a DOE of very weak power, because longitudinal chromatic aberration and chromatic aberration of magnification can be reduced as much as possible. In addition, the DOE is effective for the correction of higher-order chromatic aberrations of magnification because it has additionally an aspheric effect.

Condition (1) is provided to make very favorable correction for the longitudinal chromatic aberration of such a phototaking lens system or define the power profile or distribution of the aforesaid DOE. When the lower limit of 0.005 in condition (1) is not reached, the power of the DOE is substantially ineffective and so chromatic aberrations become worse. This is not preferable because a sufficient number of DOE zones required for the diffraction phenomenon is not ensured. When the upper limit of 0.03 in condition (1) is exceeded, the power of the DOE becomes too strong, resulting in the over-correction of longitudinal chromatic aberration and chromatic aberration of magnification. This is also not preferable because secondary spectra cannot be removed from the longitudinal chromatic aberration due to the high dispersion of the DOE.

More preferably, condition (1) is reduced to $$0.01 < f/f_{DOE} < 0.025 \quad (4)$$

Within this range, it is possible to make much better correction for longitudinal chromatic aberration.

Condition (2) is provided to reduce longitudinal chromatic aberration and chromatic aberration of magnification produced at the front lens group as much as possible. In other words, Condition (2) represents an equivalent Abbe's number difference between the positive lens or lenses and the negative lens or lenses in the front lens group. As already noted, the retrofocus type phototaking lens system produces, at the rear lens group, longitudinal chromatic aberration and chromatic aberration of magnification with the same sign and, at the front lens group, positive longitudinal chromatic aberration and negative chromatic aberration of magnification. It is thus desired to reduce the chromatic aberrations as much as possible. When the upper limit of 0 in condition (2) is exceeded, the amount of the positive longitudinal chromatic aberration produced at the front lens group becomes small. To make good correction for the longitudinal chromatic aberration, therefore, it is required to intensify the power of the DOE. However, this is not preferable because the DOE is located at a position where an off-axis chief ray attains considerable height, resulting in the over-correction of the chromatic aberration of magnification. When the lower limit of −1.5 in condition (2) is not reached, the positive longitudinal chromatic aberration produced at the front lens group becomes large. Unless, in this case, the power of the DOE is extremely diminished, the over-correction of the chromatic aberration of magnification will take place. This is also not preferable because large negative chromatic aberrations of magnification produced at the front and rear lens groups cannot be corrected.

More preferably, condition (2) is reduced to $$-1.2 < f_{DOE}/\nu_1 < -0.1 \quad (5)$$

Within this range, it is possible to make correction for longitudinal chromatic aberration and chromatic aberration of magnification in a much better balanced state.

Condition (3) is provided to make well balanced correction for longitudinal chromatic aberration and chromatic aberration of magnification produced at the front lens group without making off-axis aberrations worse. In other words, this condition represents an equivalent Abbe's number difference between the positive lens or lenses and the negative lens or lenses in the rear lens group.

By properly distributing the powers of the positive and negative lenses as defined by condition (3), it is possible to make good correction for chromatic aberrations while off-axis aberrations such as spherical aberration, coma and astigmatism are kept in reasonable condition. Exceeding the upper limit of 0.7 in condition (3) is not preferable because both the longitudinal chromatic aberration and the chromatic aberration of magnification remain under-corrected. A negative power reduction is also not preferable because monochromatic aberrations such as spherical aberration and coma, too, become worse. Falling below the lower limit of −0.5 in condition (3) is again not preferable because both the longitudinal chromatic aberration and the chromatic aberration of magnification remain over-corrected.

More preferably, condition (3) is reduced to $$-0.3<f_{DOE}/v_2<0.6 \tag{6}$$

Within this range, it is possible to make well balanced correction for longitudinal chromatic aberration and chromatic aberration of magnification.

Most preferably, condition (3) is reduced to $$-0.3<f_{DOE}/v_2<0.2 \tag{7}$$

Within this range, it is possible to make much better balanced correction for the longitudinal chromatic aberration and chromatic aberration of magnification without making off-axis aberrations worse.

To ensure a back focus long enough to locate suitable optical means such as an optical low-pass filter and an infrared cutoff filter between the phototaking lens and the phototaking element, it is desired that the wide-angle lens system of the invention satisfy the following conditions:

$$-1.1<f/f_1<-0.1 \tag{8}$$

$$0.3<f/f_2<0.7 \tag{9}$$

where $f_1$ is a focal length of the front lens group and $f_2$ is a focal length of the rear lens group.

Conditions (8) and (9) are provided to ensure a very long back focus while the ability to form images is in reasonable condition. In other words, these conditions define the distribution of power of the front and rear lens groups with respect to the power of the wide-angle lens system of the invention. A retrofocus type image pickup lens system renders it difficult to make correction for off-axis aberrations because the distribution of power is asymmetric with respect to an aperture stop. When the lower limit of −1.1 in condition (8) is not reached, it is possible to make sure of a sufficient back focus. However, since the height of an off-axis chief ray through the front lens group is higher than that through the rear lens group, off-axis aberrations such as coma, astigmatism and distortion become worse, and so it is very difficult to make correction for them. Further, negative chromatic aberration of magnification produced at the front lens group increases. Furthermore, an increase in the power of the front lens group is not preferable because it is then required to intensify the power of the rear lens group further, thus making correction of aberrations much more difficult. Exceeding the upper limit of −0.1 in condition (8) is not preferable for a phototaking lens system in the technical field to which the present invention belongs, because the power of the front lens group becomes too weak to make sure of a sufficient back focus. Falling below the lower limit of 0.3 in condition (9) is not preferable because the power of the front lens group must be diminished, resulting in some considerable increase in the total length of the wide-angle lens system of the invention. Exceeding the upper limit of 0.7 in condition (9) is again not preferable because it is difficult to make sure of a back focus and so it is required to intensify the power of the front lens group, resulting in a marked deterioration in off-axis aberrations produced at the front lens group. It is also required to intensify the power of the positive lens or lenses located in the rear lens group, resulting in some considerable under-correction of spherical aberration.

By satisfying conditions (8) and (9), it is thus possible to make sure of a sufficient back focus while spherical aberration and off-axis aberrations are kept in reasonable condition.

More preferably, condition (9) is reduced to $$0.35<f/f_2<0.55 \tag{10}$$

Within this range, it is possible to make sure of a sufficient back focus while monochromatic aberrations and chromatic aberrations are much better corrected.

Preferably, the wide-angle lens system of the invention satisfies the following condition:

$$-2.1<f_{1r}/f_{2f}<-0.5 \tag{11}$$

where $f_{1r}$ is a focal length of a lens located nearest to an image side of the front lens group, and $f_{2f}$ is a focal length of a lens located nearest to an object side of the rear lens group.

Condition (11) is provided to make good correction for spherical aberration and Petzval's sum in particular. In other words, this condition defines the power of the lens located nearest to the image side of the front lens group and the power of the lens located nearest to the object side of the rear lens group. In Example 1, 2, 3, 4, 5, 7, and 8 given later, the lens located nearest to the image side of the front lens group is a positive lens and the lens located nearest to the object side of the rear lens group is a negative lens. The positive lens is effective for reducing positive spherical aberration and positive Petzval's sum noticeably produced at the front lens group as much as possible, whereas the negative lens in the rear lens group enables negative spherical aberration and negative Petzval's sum noticeably produced at the rear lens group to be reduced as much as possible. Exceeding the upper limit of −0.5 in condition (11) is not preferable because the spherical aberration and Petzval's sum remain over-corrected. Falling below the lower limit of −2.1 in condition (11) is again not preferable because the spherical aberration and Petzval's sum rather remain under-corrected. In Example 6 given hereinafter, the lens located nearest to the image side of the front lens group is a negative lens and the lens located nearest to the object side of the rear lens group is a positive lens. Among light rays passing through these negative and positive lenses, an axial marginal ray attains the greatest height, and so a large positive spherical aberration is produced at the negative lens. However, this positive spherical aberration is well corrected by producing negative spherical aberration at the aforesaid positive lens. This also holds for the Petzval's sum; the Petzval's sum is well corrected by the aforesaid negative and positive lenses. Thus, exceeding the upper limit of −0.5 in condition (11) is not preferable because the spherical aberration and Petzval's sum remain over-corrected. Falling below the lower limit of −2.1 in condition (11) is again not preferable because the spherical aberration and Petzval's sum rather remain under-corrected.

By combining conditions (8) to (11) with one or two or more of conditions (1) to (7), it is possible to provide a much better wide-angle lens system.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Hereinafter, several embodiments of the wide-angle lens system according to the invention will be explained.

Among methods of designing an optical system including a diffractive optical element used in the invention, the Sweatt Model is well known in the art. In this regard, see W. C. Sweatt, "NEW METHODS OF DESIGNING HOLOGRAPHIC ELEMENT", SPIE, Vol. 126, Clever Optics, 46–53 (1997). In this model, a diffractive optical element is replaced by a virtual refractive lens (an ultra high index lens) having a very large refractive index. This model is applied to the examples given later. It is here to be noted that the diffractive optical element used in each example is designed with a virtual refractive index of 1001 at 587.56 nm wavelength (d-line). It is also to be noted that an aspheric surface of the ultra high index lens is given by:

$$Z = CY^2/[1+\sqrt{1-(1+K)C^2Y^2}] + A_4Y^4 + A_6Y^6 + A_8Y^8 + A_{10}Y^{10} + \quad \text{(a)}$$

where Z is an axis representing an optical axis direction, Y is an axis representing a direction vertical to the optical axis, C is a curvature of a surface apex (=1/r where r is a radius of curvature), K is a conical coefficient, and $A_4$, $A_6$, $A_8$, and $A_{10}$ are fourth, sixth, eighth, and tenth aspherical coefficients, respectively.

A surface that is in contact with the diffractive surface at nil thickness is a surface of substrate material. In actual production, a phase change is first found from a difference between the aspherical shape of the diffractive surface and the surface shape of the substrate material, and the index of refraction. Then, this phase change is converted into the pitch of a diffraction grating, which is in turn formed on the surface of the substrate material. In each example given later, therefore, it is the surface of the substrate material which acts eventually as a lens. The aspheric surface defined by the ultra high index lens does not actually exist, although referred to as a diffractive surface. It is to be noted, however, that the surface No. referred to as the diffractive surface in the numerical data is denoted as a substrate surface in the sectional schematic corresponding to each example.

Figure 10:
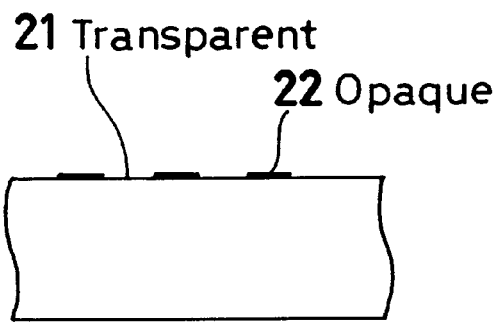
FIG. 10 is a sectional schematic illustrative of one embodiment of the diffractive surface used in the invention.
Figure 10B:
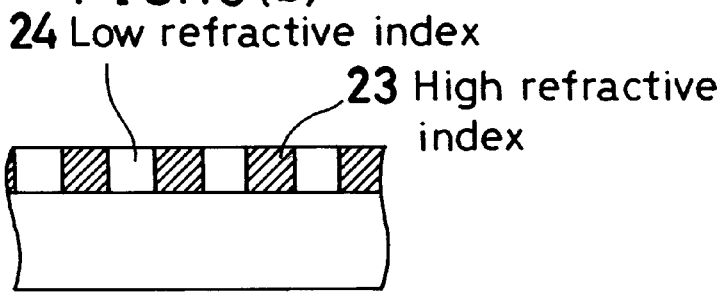
Figure 10C:
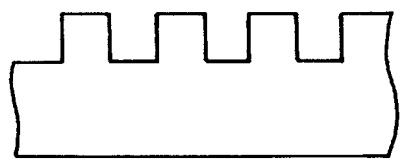
Figure 10D:
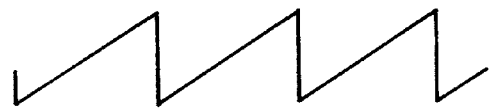
Figure 10E:
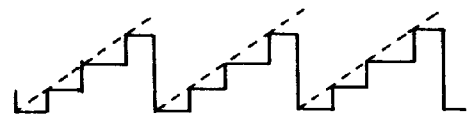
Figure 10F:

Some specific shapes of the diffractive surface, for instance, are shown in section in FIG. 10. A diffractive surface depicted in FIG. 10(a) comprises an alternation of transparent portions 21, and opaque portions 22 whose thickness is substantially zero, and is called an amplitude modulation type. A diffractive surface depicted in FIG. 10(b) comprises an alternation of portions having different indices of refraction, i.e., high-refractive-index portions 23 and low-refractive-index portions 24, and produces diffractive action through a phase difference due to a refractive index difference. A diffractive surface depicted in FIG. 10(c) comprises an alternation of convex and concave portions, each in a rectangular form, and produces diffractive action through a phase difference due to a thickness difference. This may be called a two-level binary element. A diffractive surface depicted in FIG. 10(d), called a kinoform, is in a saw-toothed form, and produces diffractive action through a phase difference due to a continuous thickness difference. Diffractive surfaces depicted in FIG. 10(e) and 10(f) are binary elements with the kinoform approximated at four, and eight levels, respectively (see FIG. 3). Thus, several shape types of diffractive surfaces are available. In the present invention, it is desired to use the kinoform of FIG. 10(d), and the binary element of FIG. 10(e) or 10(f), with the kinoform approximated at four or more levels, because the quantity of light can be effectively used at an increased diffraction efficiency.

In each example of the invention, the chromatic aberration of magnification is well corrected to the periphery of the field angle without recourse to any anomalous dispersion glass, as already mentioned. In each example, the diffractive surface is formed on a plane-parallel plate. Even though the diffractive surface is formed on a portion of a plate having curvature, similar effects will be achievable.

Figure 1:
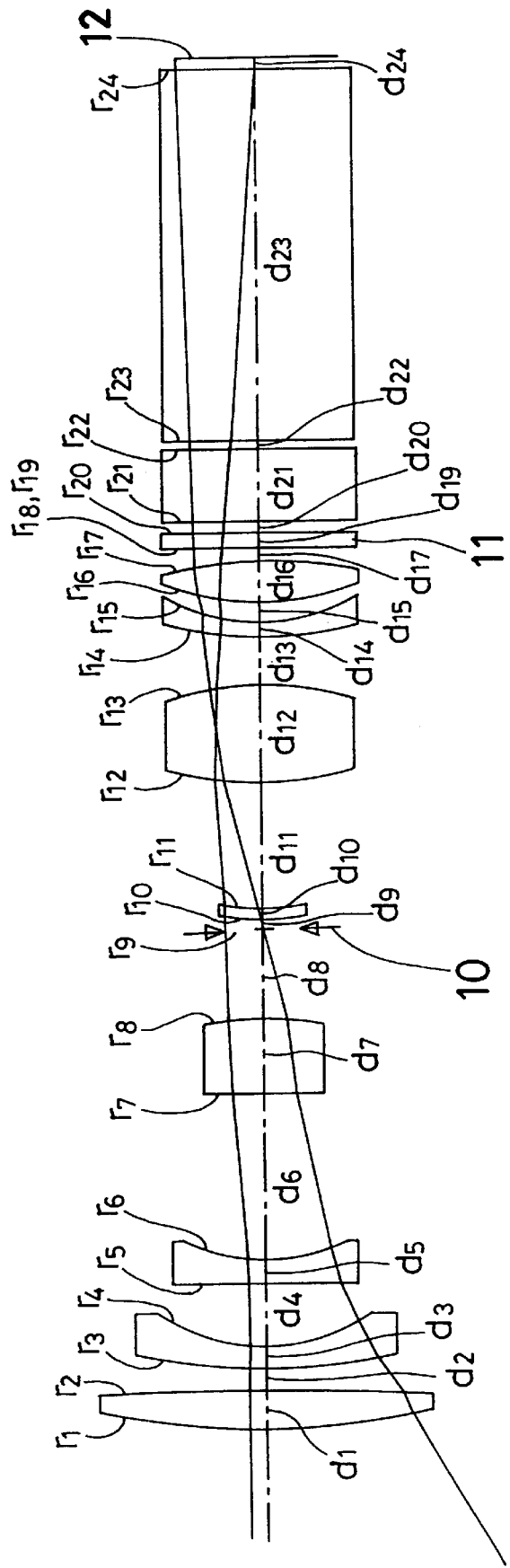
FIG. 1 is a sectional schematic of Example 1 of the wide-angle lens system according to the invention.

FIGS. 1 to 8 are sectional schematics of Examples 1 to 8 of the wide-angle lens system of the invention. FIG. 9 is aberration diagrams showing spherical aberration (a), astigmatism (b), distortion (c), chromatic aberration of magnification (d) and coma (e) in Example 1. The states of aberration correction in other examples are similar to that in Example 1, and so are not illustrated. Herein, two plane-parallel plates located nearest to an image plane 12 in Example 1 of FIG. 1 are regarded as an infrared cutoff filter and a low-pass filter, respectively. This will hold for all other examples. In FIGS. 1 to 8, it is to be noted that reference numerals 10, 11 and 12 represent a stop, a plane-parallel plate on which the diffractive surface or DOE is formed and an image plane, respectively.

As can be seen from FIG. 1, a wide-angle lens system of Example 1 is made up of a front lens group located between a stop 10 and an object side thereof and consisting of four refractive lenses, a rear lens group located between the stop 10 and an image plane side thereof and consisting of four refractive lenses, and a DOE located on an object side of a plane-parallel plate 11 disposed on an image plane side of the refractive lenses in the rear lens group. The front lens group consists of, in order from the object side of the wide-angle lens system, a double-convex lens, a negative meniscus lens convex toward the object side, a negative meniscus lens convex toward the object side and a positive meniscus lens convex toward an image side of the wide-angle lens system, and the rear lens group consists of a negative meniscus lens convex toward the object side, a double-convex lens, a negative meniscus lens convex toward the object side and a double-convex lens. In this example, the refractive lens are made up of three vitreous materials alone so that significant cost reductions are achievable, and chromatic aberration of magnification is well corrected to the periphery of the field angle.

Figure 2:
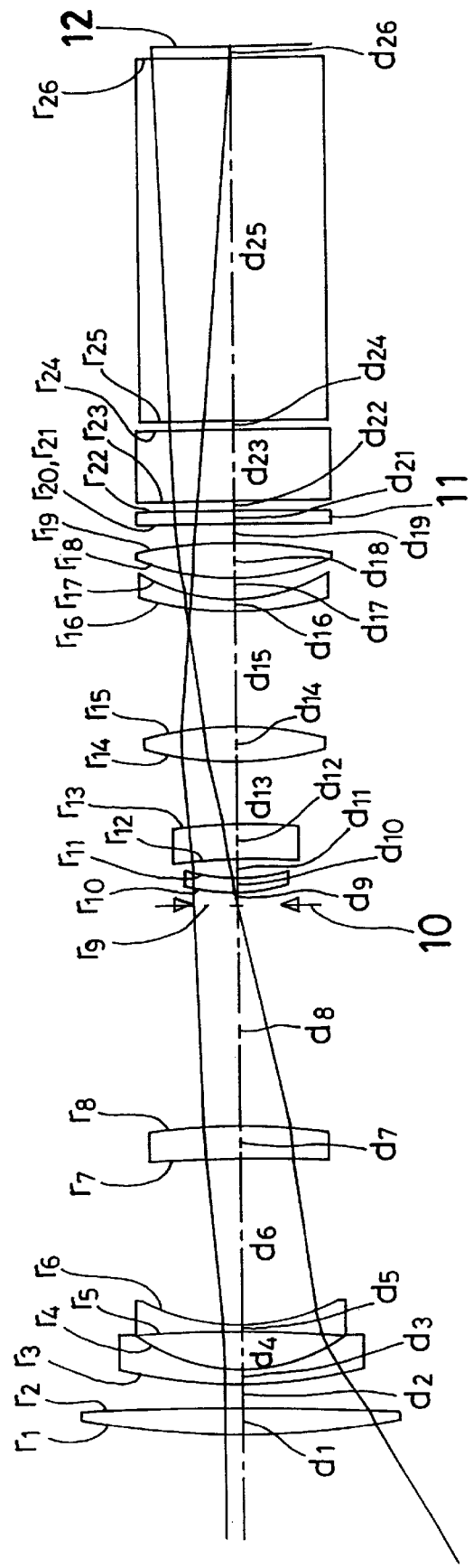
FIG. 2 is a sectional schematic of Example 2 of the wide-angle lens system according to the invention.

As can be seen from FIG. 2, a wide-angle lens system of Example 2 is made up of a front lens group located between a stop 10 and an object side thereof and consisting of four refractive lenses, a rear lens group located between the stop 10 and an image plane side thereof and consisting of five refractive lenses, and a DOE located on an object side of a plane-parallel plate 11 disposed on an image plane side of the refractive lenses in the rear lens group. The front lens group consists of, in order from the object side of the wide-angle lens system, a double-convex lens, a negative meniscus lens convex toward the object side, a double-convex lens and a positive meniscus lens convex toward an image side of the wide-angle lens system, and the rear lens group consists of a negative meniscus lens convex toward the object side, a positive meniscus lens convex toward the image plane side, a double-convex lens, a negative meniscus lens convex toward the object side and a double-convex lens. In this example, chromatic aberration of magnification is corrected to a very low level even in the outermost periphery of the field angle, as expressed by 2.7 μm at a height corresponding to 70% of the maximum image height.

Figure 3:
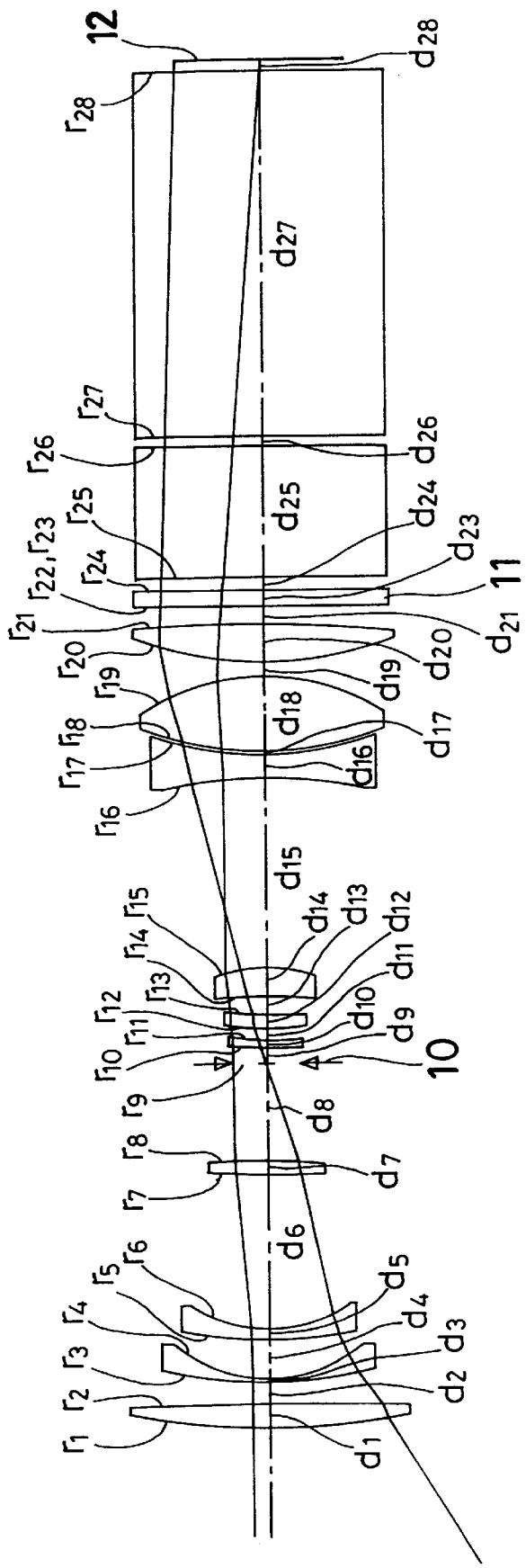
FIG. 3 is a sectional schematic of Example 3 of the wide-angle lens system according to the invention.

As can be seen from FIG. 3, a wide-angle lens system of Example 3 is made up of a front lens group located between a stop 10 and an object side thereof and consisting of four refractive lenses, a rear lens group located between the stop 10 and an image plane side thereof and consisting of six refractive lenses, and a DOE located on an object side of a plane-parallel plate 11 disposed on an image plane side of the refractive lenses in the rear lens group. The front lens group consists of, in order from the object side of the wide-angle lens system, a double-convex lens, a negative meniscus lens convex toward the object side, a negative meniscus lens convex toward an image plane side of the wide-angle lens system and a double-convex lens, and the rear lens group consists of a negative meniscus lens convex toward the object side, a positive meniscus lens convex toward the object side, a positive meniscus lens convex toward the image plane side, a double-concave lens, a double-convex lens and a double-convex lens. In this example, too, chromatic aberration of magnification is well corrected to the outermost periphery of the field angle.

Figure 4:
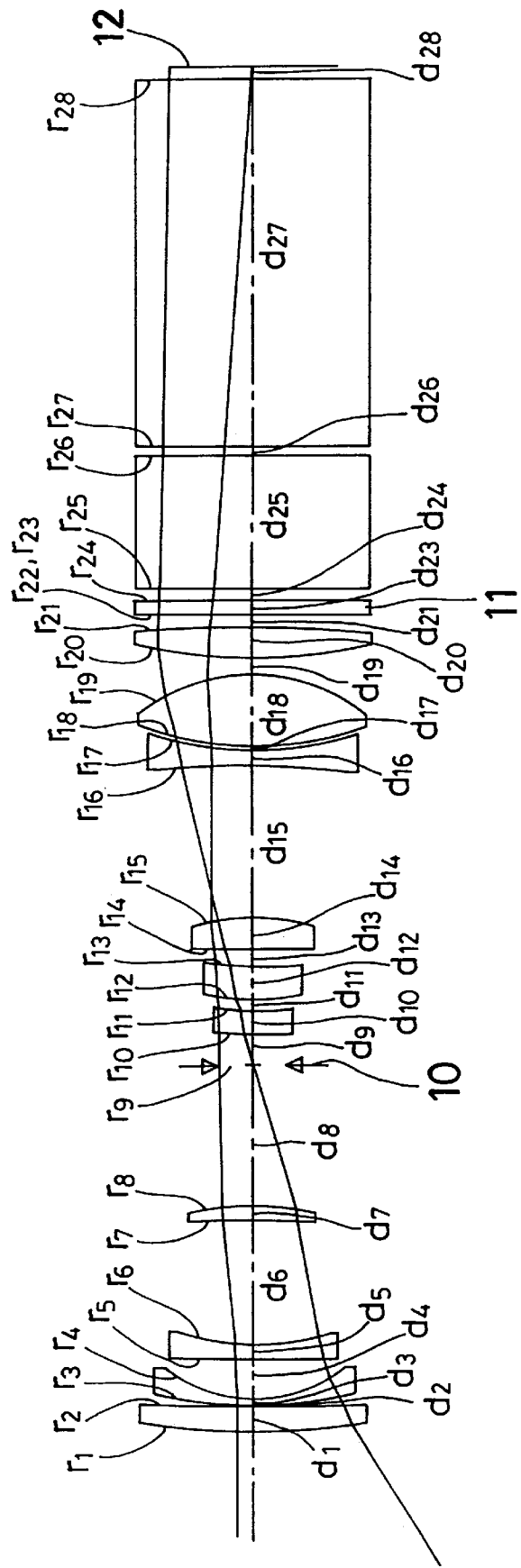
FIG. 4 is a sectional schematic of Example 4 of the wide-angle lens system according to the invention.

As can be seen from FIG. 4, a wide-angle lens system of Example 4 is made up of a front lens group located between a stop 10 and an object side thereof and consisting of four refractive lenses, a rear lens group located between the stop 10 and an image plane side thereof and consisting of six refractive lenses, and a DOE located on an object side of a plane-parallel plate 11 disposed on an image plane side of the refractive lenses in the rear lens group. The front lens group consists of, in order from the object side of the wide-angle lens system, a positive meniscus lens convex toward an object side of the wide-angle lens system, a negative meniscus lens convex toward the object side, a negative meniscus lens convex toward the object side and a double-convex lens, and the rear lens group consists of a negative meniscus lens convex toward the objet side, a positive meniscus lens toward the object side, a double-convex lens, a double-concave lens, a double-convex lens and a double-convex lens. In this example, too, chromatic aberration of magnification is well corrected to the outermost periphery of the field angle.

Figure 5:
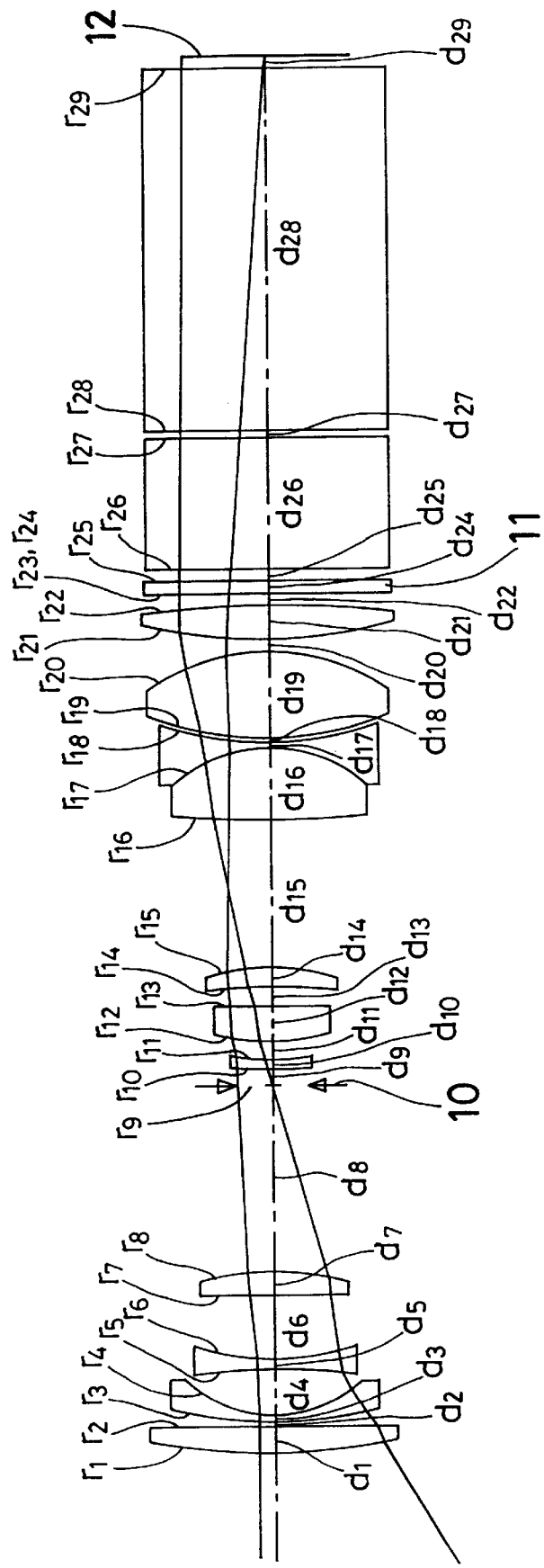
FIG. 5 is a sectional schematic of Example 5 of the wide-angle lens system according to the invention.

As can be seen from FIG. 5, a wide-angle lens system of Example 5 is made up of a front lens group located between a stop 10 and an object side thereof and consisting of four refractive lenses, a rear lens group located between the stop 10 and an image plane side thereof and consisting of seven refractive lenses, and a DOE located on an object side of a plane-parallel plate 11 disposed on an image plane side of the refractive lenses in the rear lens group. The front lens group consists of, in order from the object side of the wide-angle lens system, a positive meniscus lens convex toward the object side, a negative meniscus lens convex toward the object side, a double-concave lens and a positive meniscus lens convex toward the image plane side of the wide-angle lens system, and the rear lens group consists of a negative meniscus lens convex toward the object side, a positive meniscus lens convex toward the object side, a positive meniscus lens convex toward the image plane side of the wide-angle lens system, a cemented lens composed of a double-convex lens and a double-concave lens, a double-convex lens and a double-convex lens. In this example, one cemented lens is used in the rear lens group. By use of this cemented lens, it is possible to make much better correction for longitudinal chromatic aberration and chromatic aberration of magnification.

Figure 6:
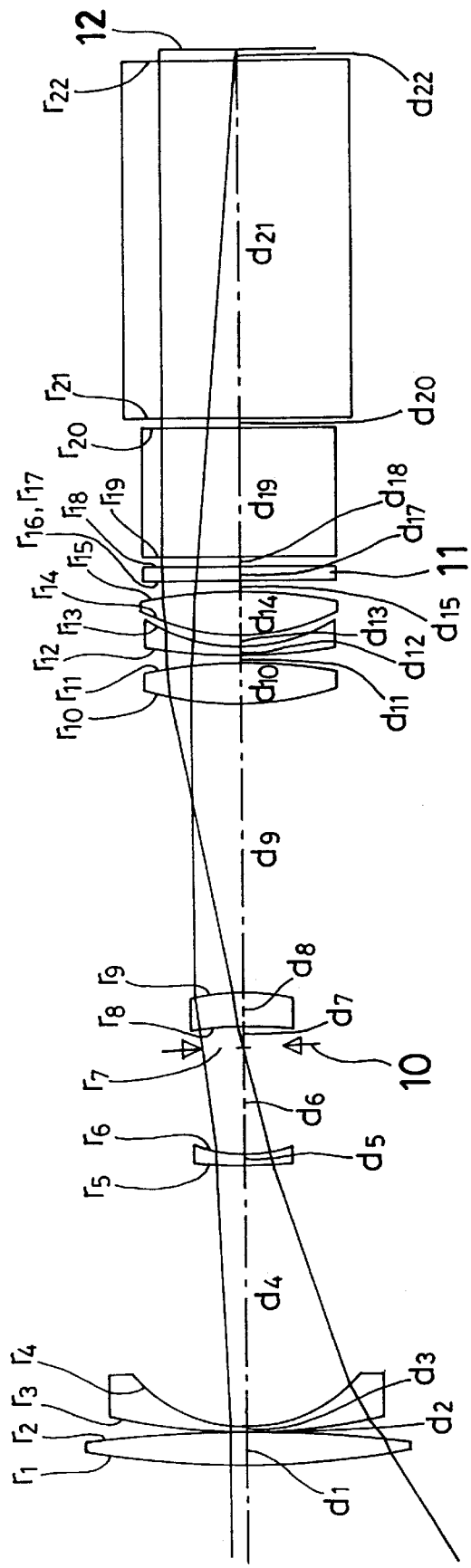
FIG. 6 is a sectional schematic of Example 6 of the wide-angle lens system according to the invention.

As can be seen from FIG. 6, a wide-angle lens system of Example 6 is made up of a front lens group located between a stop 10 and an object side thereof and consisting of three refractive lenses, a rear lens group located between the stop 10 and an image plane side thereof and consisting of four refractive lenses, and a DOE located on an object side of a plane-parallel plate 11 disposed on an image plane side of the refractive lenses in the rear lens group. The front lens group consists of, in order from the object side of the wide-angle lens system, a double-convex lens, a negative meniscus lens convex toward the object side and a negative meniscus lens convex toward the object side, and the rear lens group consists of a positive meniscus lens convex toward the image side of the wide-angle lens system, a double-convex lens, a negative meniscus lens convex toward the object side and a double-convex lens. In this example, both longitudinal chromatic aberration and chromatic aberration of magnification are well corrected at a field angle of 60° or larger although the wide-angle lens system is composed of a very reduced number of lenses.

Figure 7:
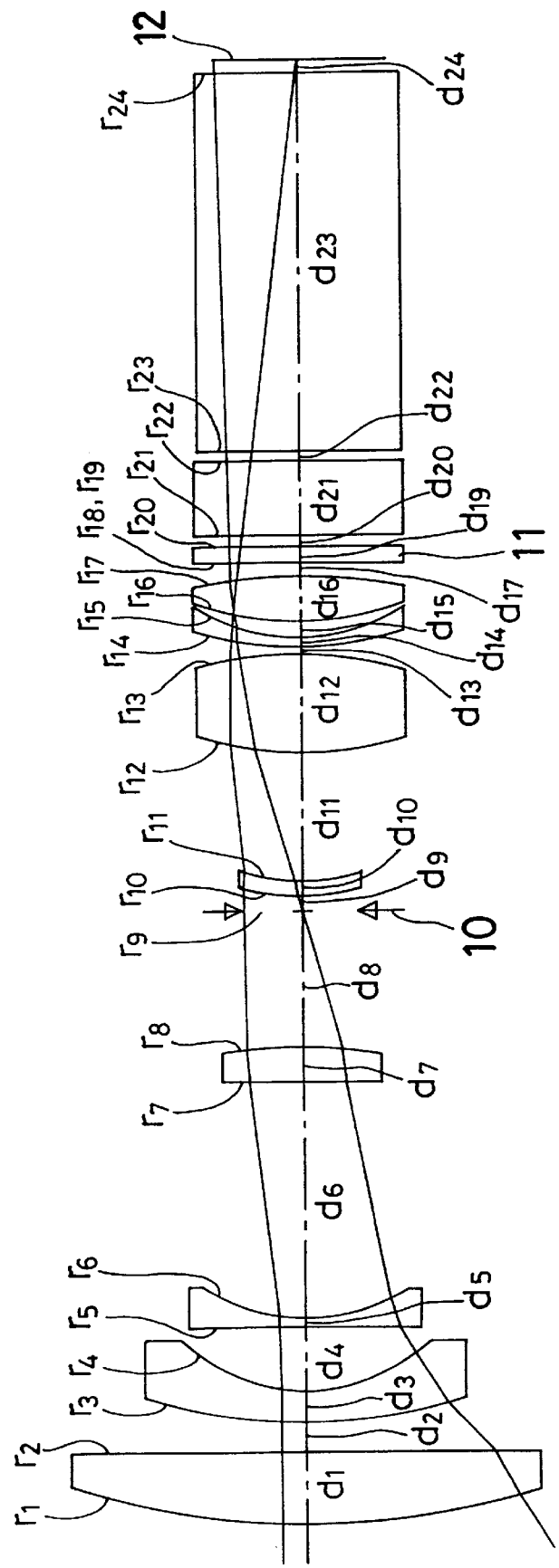
FIG. 7 is a sectional schematic of Example 7 of the wide-angle lens system according to the invention.

As can be seen from FIG. 7, a wide-angle lens system of Example 7 is made up of a front lens group located between a stop 10 and an object side thereof and consisting of four refractive lenses, a rear lens group located between the stop 10 and an image plane side thereof and consisting of four refractive lenses, and a DOE located on an object side of a plane-parallel plate 11 disposed on an image plane side of the refractive lenses in the rear lens group. The front lens group consists of, in order from the object side of the wide-angle lens system, a double-convex lens, a negative meniscus lens convex toward the object side of the wide-angle lens system, a double-concave lens and a double-convex lens, and the rear lens group consists of a negative meniscus lens convex toward the object side, a double-convex lens, a negative meniscus lens convex toward the object side and a double-convex lens. In this example, an F-number is 2.8 at a field angle of 60° or larger and both longitudinal chromatic aberration and chromatic aberration of magnification are well corrected.

Figure 8:
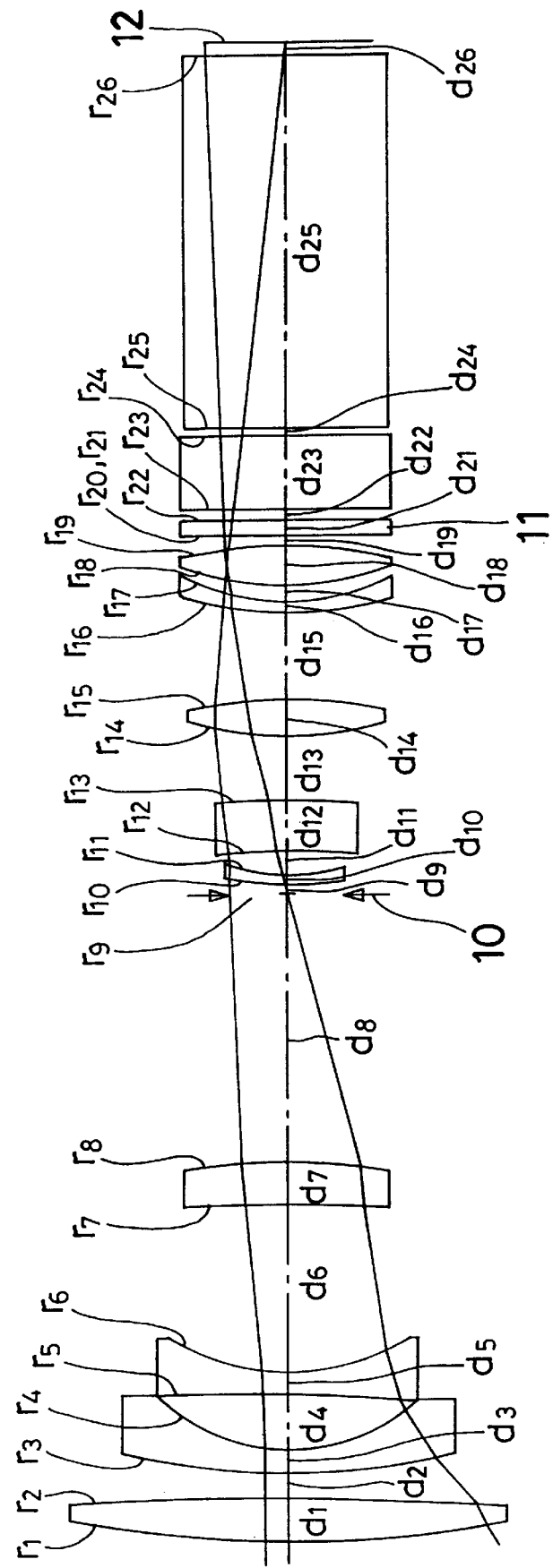
FIG. 8 is a sectional schematic of Example 8 of the wide-angle lens system according to the invention.
Figure 9:
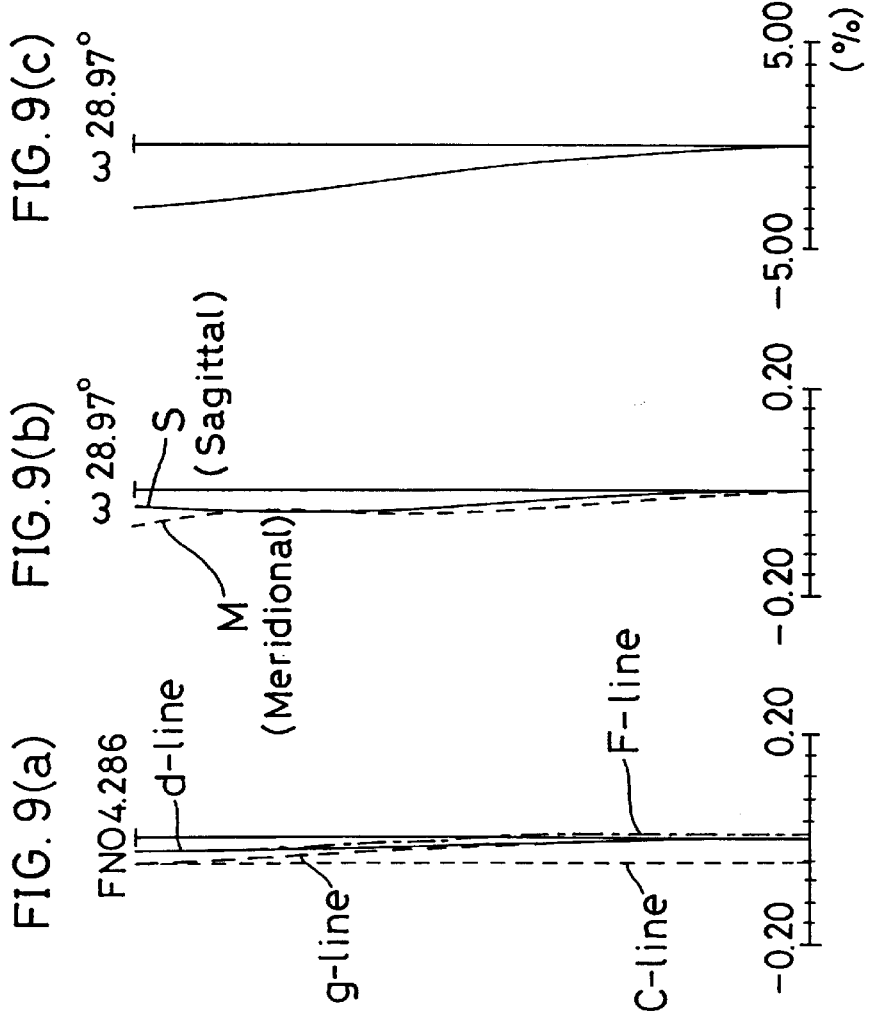
FIG. 9 is aberration diagrams for Example 1.

As can be seen from FIG. 8, a wide-angle lens system of Example 8 is made up of a front lens group located between a stop 10 and an object side thereof and consisting of four refractive lenses, a rear lens group located between the stop 10 and an image plane side thereof and consisting of five refractive lenses, and a DOE located on an object side of a plane-parallel plate 11 disposed on an image plane side of the refractive lenses in the rear lens group. The front lens group consists of, in order from the object side of the wide-angle lens system, a double-convex lens, a negative meniscus lens convex toward the object side of the wide-angle lens system, a double-concave lens and a positive meniscus lens convex toward the object side, and the rear lens group consists of a negative meniscus lens convex toward the object side, a double-convex lens, a negative meniscus lens convex toward the object side and a double-convex lens. In this example, too, an F-number is 2.8 at a field angle of 60° or larger and both longitudinal chromatic aberration and chromatic aberration of magnification are well corrected.

Enumerated below are numerical data about Examples 1 to 8. In these data, symbols used hereinafter but not hereinbefore have the following meanings.

f . . . focal length
$F_{NO}$ . . . F-number
$2\omega$ . . . field angle
$r_1, r_2$ . . . radius of curvature of each lens surface
$d_1, d_2$ . . . separation between adjacent lens surfaces
$n_{d1}, n_{d2}$ . . . d-line refractive index of each lens
$\nu_{d1}, \nu_{d2}$ . . . d-line Abbe's number of each lens Aspheric shape is given by the aforesaid equation (a). "OBJ", "IMG" and "DOE" represent an object surface, an image plane and a diffractive surface, respectively.

Example 1

$f = 20.05163, F_{NO} = 4.29, 2\omega = 57.935°$

| | | | | | | | |
|---|---|---|---|---|---|---|---|
| OBJ = | ∞ | $d_0 =$ | ∞ | | | | |
| $r_1 =$ | 104.2263 | $d_1 =$ | 5.0000 | $n_{d1} =$ | 1.48749 | $\nu_{d1} =$ | 70.23 |
| $r_2 =$ | −1132.0115 | $d_2 =$ | 3.0008 | | | | |
| $r_3 =$ | 81.8445 | $d_3 =$ | 3.0000 | $n_{d2} =$ | 1.58913 | $\nu_{d2} =$ | 61.14 |
| $r_4 =$ | 24.7620 | $d_4 =$ | 8.7255 | | | | |
| $r_5 =$ | 1276.0650 | $d_5 =$ | 3.0000 | $n_{d3} =$ | 1.58913 | $\nu_{d3} =$ | 61.14 |
| $r_6 =$ | 24.2932 | $d_6 =$ | 22.5948 | | | | |
| $r_7 =$ | −645.0758 | $d_7 =$ | 10.0000 | $n_{d4} =$ | 1.76182 | $\nu_{d4} =$ | 26.52 |
| $r_8 =$ | −58.0117 | $d_8 =$ | 11.6142 | | | | |
| $r_9 =$ | ∞ (Stop) | $d_9 =$ | 2.0098 | | | | |
| $r_{10} =$ | 29.6045 | $d_{10} =$ | 1.0000 | $n_{d5} =$ | 1.58913 | $\nu_{d5} =$ | 61.14 |
| $r_{11} =$ | 21.3620 | $d_{11} =$ | 17.0338 | | | | |
| $r_{12} =$ | 45.2190 | $d_{12} =$ | 13.3902 | $n_{d6} =$ | 1.48749 | $\nu_{d6} =$ | 70.23 |
| $r_{13} =$ | −42.1492 | $d_{13} =$ | 6.5373 | | | | |
| $r_{14} =$ | 50.8480 | $d_{14} =$ | 2.0349 | $n_{d7} =$ | 1.76182 | $\nu_{d7} =$ | 26.52 |
| $r_{15} =$ | 25.0239 | $d_{15} =$ | 2.4911 | | | | |
| $r_{16} =$ | 34.2647 | $d_{16} =$ | 5.8056 | $n_{d8} =$ | 1.48749 | $\nu_{d8} =$ | 70.23 |
| $r_{17} =$ | −61.0751 | $d_{17} =$ | 1.5603 | | | | |
| $r_{18} =$ | $1.536 \times 10^6$ (DOE) | $d_{18} =$ | 0.0000 | $n_{d9} =$ | 1001 | $\nu_{d9} =$ | −3.45 |
| $r_{19} =$ | ∞ | $d_{19} =$ | 2.0000 | $n_{d10} =$ | 1.69400 | $\nu_{d10} =$ | 56.29 |
| $r_{20} =$ | ∞ | $d_{20} =$ | 1.5075 | | | | |
| $r_{21} =$ | ∞ | $d_{21} =$ | 10.0000 | $n_{d11} =$ | 1.51633 | $\nu_{d11} =$ | 64.14 |
| $r_{22} =$ | ∞ | $d_{22} =$ | 1.0000 | | | | |
| $r_{23} =$ | ∞ | $d_{23} =$ | 50.0000 | $n_{d12} =$ | 1.58267 | $\nu_{d12} =$ | 46.42 |
| $r_{24} =$ | ∞ | $d_{24} =$ | 1.5018 | | | | |
| IMG = | ∞ | | | | | | |

Aspherical Coefficients
18th surface $K = -1.0000$
$A_4 = -1.4932 \times 10^{-10}$
$A_6 = -4.7730 \times 10^{-13}$
$A_8 = 1.0914 \times 10^{-14}$
$A_{10} = -4.0491 \times 10^{-18}$
$f_1 = -95.000$
$f_2 = 42.286$
$f_{DOE} = 1535.681$
$f/f_{DOE} = 0.0131$
$f_{DOE}/\nu_1 = -0.1970$
$f_{DOE}/\nu_2 = -0.1090$
$f/f_1 = -0.211$
$f/f_2 = 0.474$
$f_{1r}/f_{2f} = -0.609$

Example 2

$f = 20.09999, F_{NO} = 4.00, 2\omega = 57.818°$

| | | | | | | | |
|---|---|---|---|---|---|---|---|
| OBJ = | ∞ | $d_0 =$ | ∞ | | | | |
| $r_1 =$ | 123.1835 | $d_1 =$ | 3.6624 | $n_{d1} =$ | 1.48749 | $\nu_{d1} =$ | 70.23 |
| $r_2 =$ | −453.8146 | $d_2 =$ | 3.5000 | | | | |
| $r_3 =$ | 75.1150 | $d_3 =$ | 1.6712 | $n_{d2} =$ | 1.62041 | $\nu_{d2} =$ | 60.28 |
| $r_4 =$ | 24.4350 | $d_4 =$ | 5.0150 | | | | |
| $r_5 =$ | −3055.3564 | $d_5 =$ | 1.5000 | $n_{d3} =$ | 1.72000 | $\nu_{d3} =$ | 46.04 |
| $r_6 =$ | 29.1066 | $d_6 =$ | 22.4457 | | | | |
| $r_7 =$ | −516.9597 | $d_7 =$ | 5.0000 | $n_{d4} =$ | 1.76182 | $\nu_{d4} =$ | 26.52 |
| $r_8 =$ | −59.9109 | $d_8 =$ | 30.3432 | | | | |
| $r_9 =$ | ∞ (Stop) | $d_9 =$ | 2.0000 | | | | |
| $r_{10} =$ | 37.2341 | $d_{10} =$ | 1.7000 | $n_{d5} =$ | 1.70000 | $\nu_{d5} =$ | 48.08 |
| $r_{11} =$ | 24.7815 | $d_{11} =$ | 2.5000 | | | | |

-continued

| | | | | | | | |
|---|---|---|---|---|---|---|---|
| $r_{12}$ = | −116.7301 | $d_{12}$ = | 5.0000 | $n_{d6}$ = | 1.78472 | $\nu_{d6}$ = | 25.68 |
| $r_{13}$ = | −98.1781 | $d_{13}$ = | 8.4026 | | | | |
| $r_{14}$ = | 40.4685 | $d_{14}$ = | 5.0000 | $n_{d7}$ = | 1.48749 | $\nu_{d7}$ = | 70.23 |
| $r_{15}$ = | −50.8073 | $d_{15}$ = | 16.1075 | | | | |
| $r_{16}$ = | 50.0784 | $d_{16}$ = | 1.6000 | $n_{d8}$ = | 1.76182 | $\nu_{d8}$ = | 26.52 |
| $r_{17}$ = | 25.7795 | $d_{17}$ = | 2.9061 | | | | |
| $r_{18}$ = | 35.6972 | $d_{18}$ = | 4.9318 | $n_{d9}$ = | 1.48749 | $\nu_{d9}$ = | 70.23 |
| $r_{19}$ = | −61.0752 | $d_{19}$ = | 2.2144 | | | | |
| $r_{20}$ = | $1.421 \times 10^6$ (DOE) | $d_{20}$ = | 0.0000 | $n_{d10}$ | 1001 | $\nu_{d10}$ = | −3.45 |
| $r_{21}$ = | ∞ | $d_{21}$ = | 2.0000 | $n_{d11}$ = | 1.69400 | $\nu_{d11}$ = | 56.29 |
| $r_{22}$ = | ∞ | $d_{22}$ = | 1.5000 | | | | |
| $r_{23}$ = | ∞ | $d_{23}$ = | 10.0000 | $n_{d12}$ = | 1.51663 | $\nu_{d12}$ = | 64.14 |
| $r_{24}$ = | ∞ | $d_{24}$ = | 1.0000 | | | | |
| $r_{25}$ = | ∞ | $d_{25}$ = | 50.0000 | $n_{d13}$ = | 1.58267 | $\nu_{d13}$ = | 46.42 |
| $r_{26}$ = | ∞ | $d_{26}$ = | 1.4999 | | | | |
| IMG = | ∞ | | | | | | |

Aspherical Coefficients
20th surface $K = -1.0000$
$A_4 = -2.6702 \times 10^{-10}$
$A_6 = 8.7039 \times 10^{-13}$
$A_8 = 3.0516 \times 10^{-15}$
$A_{10} = -1.2660 \times 10^{-17}$
$f_1 = -68.319$
$f_2 = 44.603$
$f_{DOE} = 1420.901$
$f/f_{DOE} = 0.0141$
$f_{DOE}/\nu_1 = -0.4628$
$f_{DOE}/\nu_2 = -0.0709$
$f/f_1 = -0.294$
$f/f_2 = 0.451$
$f_{1r}/f_{2f} = -0.790$ Example 3

$f = 19.99270, F_{NO} = 4.29, 2\omega = 58.078°$

| | | | | | | | |
|---|---|---|---|---|---|---|---|
| OBJ = | ∞ | $d_0$ = | ∞ | | | | |
| $r_1$ = | 104.6111 | $d_1$ = | 3.4547 | $n_{d1}$ = | 1.69350 | $\nu_{d1}$ = | 53.21 |
| $r_2$ = | 1282.1286 | $d_2$ = | 2.9558 | | | | |
| $r_3$ = | 52.0480 | $d_3$ = | 1.0022 | $n_{d2}$ = | 1.74400 | $\nu_{d2}$ = | 44.78 |
| $r_4$ = | 20.4865 | $d_4$ = | 4.9718 | | | | |
| $r_5$ = | 60.7226 | $d_5$ = | 1.8473 | $n_{d3}$ = | 1.70000 | $\nu_{d3}$ = | 48.08 |
| $r_6$ = | 20.1417 | $d_6$ = | 20.8297 | | | | |
| $r_7$ = | 118.2838 | $d_7$ = | 2.2004 | $n_{d4}$ = | 1.74000 | $\nu_{d4}$ = | 28.28 |
| $r_8$ = | −63.1628 | $d_8$ = | 13.3483 | | | | |
| $r_9$ = | ∞ (Stop) | $d_9$ = | 2.2723 | | | | |
| $r_{10}$ = | 180.4982 | $d_{10}$ = | 0.8000 | $n_{d5}$ = | 1.74400 | $\nu_{d5}$ = | 44.78 |
| $r_{11}$ = | 19.9711 | $d_{11}$ = | 1.5059 | | | | |
| $r_{12}$ = | 22.1647 | $d_{12}$ = | 2.0000 | $n_{d6}$ = | 1.74400 | $\nu_{d6}$ = | 28.28 |
| $r_{13}$ = | 32.5331 | $d_{13}$ = | 2.6506 | | | | |
| $r_{14}$ = | −128.7956 | $d_{14}$ = | 4.0067 | $n_{d7}$ = | 1.51633 | $\nu_{d7}$ = | 64.14 |
| $r_{15}$ = | −21.6087 | $d_{15}$ = | 26.3204 | | | | |
| $r_{16}$ = | −82.9637 | $d_{16}$ = | 3.7000 | $n_{d8}$ = | 1.69895 | $\nu_{d8}$ = | 30.13 |
| $r_{17}$ = | 49.7512 | $d_{17}$ = | 0.3108 | | | | |
| $r_{18}$ = | 50.1755 | $d_{18}$ = | 10.5843 | $n_{d9}$ = | 1.48749 | $\nu_{d9}$ = | 70.23 |
| $r_{19}$ = | −27.3870 | $d_{19}$ = | 2.1478 | | | | |
| $r_{20}$ = | 52.3231 | $d_{20}$ = | 4.7606 | $n_{d10}$ = | 1.51742 | $\nu_{d10}$ = | 52.43 |
| $r_{21}$ = | −198.4388 | $d_{21}$ = | 2.6832 | | | | |
| $r_{22}$ = | $1.506 \times 10^6$ (DOE) | $d_{22}$ = | 0.0000 | $n_{d11}$ = | 1001 | $\nu_{d11}$ = | −3.45 |
| $r_{23}$ = | ∞ | $d_{23}$ = | 2.0000 | $n_{d12}$ = | 1.69400 | $\nu_{d12}$ = | 56.29 |
| $r_{24}$ = | ∞ | $d_{24}$ = | 1.6247 | | | | |
| $r_{25}$ = | ∞ | $d_{25}$ = | 18.5000 | $n_{d13}$ = | 1.51633 | $\nu_{d13}$ = | 64.14 |
| $r_{26}$ = | ∞ | $d_{26}$ = | 1.0000 | | | | |
| $r_{27}$ = | ∞ | $d_{27}$ = | 50.5000 | $n_{d14}$ = | 1.69680 | $\nu_{d14}$ = | 55.53 |
| $r_{28}$ = | ∞ | $d_{28}$ = | 1.5001 | | | | |
| IMG = | ∞ | | | | | | |

Aspherical Coefficients
22th surface $K = -1.0000$
$A_4 = -3.1088 \times 10^{-10}$
$A_6 = -3.8518 \times 10^{-13}$
$A_8 = -3.1844 \times 10^{-15}$
$A_{10} = -6.5823 \times 10^{-18}$
$f_1 = -181.600$
$f_2 = 39.581$ -continued

| | |
|---|---|
| $f_{DOE}$ = | 1505.776 |
| $f/f_{DOE}$ = | 0.0133 |
| $f_{DOE}/\nu_1$ = | -0.3198 |
| $f_{DOE}/\nu_2$ = | -0.2418 |
| $f/f_1$ = | -0.105 |
| $f/f_2$ = | 0.505 |
| $f_{1r}/f_{2f}$ = | -1.849 |

Example 4 f = 19.90392, $F_{NO}$ = 4.29, 2ω = 58.295°

| | | | | | | | |
|---|---|---|---|---|---|---|---|
| OBJ = | ∞ | $d_0$ = | ∞ | | | | |
| $r_1$ = | 98.1428 | $d_1$ = | 3.5002 | $n_{d1}$ = | 1.69350 | $\nu_{d1}$ = | 53.21 |
| $r_2$ = | 266.7137 | $d_2$ = | 0.3009 | | | | |
| $r_3$ = | 82.6252 | $d_3$ = | 1.0000 | $n_{d2}$ = | 1.65100 | $\nu_{d2}$ = | 56.16 |
| $r_4$ = | 20.8409 | $d_4$ = | 4.9601 | | | | |
| $r_5$ = | 293.1384 | $d_5$ = | 2.0056 | $n_{d3}$ = | 1.66672 | $\nu_{d3}$ = | 48.32 |
| $r_6$ = | 31.1213 | $d_6$ = | 16.9947 | | | | |
| $r_7$ = | -242.3002 | $d_7$ = | 2.0000 | $n_{d4}$ = | 1.74950 | $\nu_{d4}$ = | 35.28 |
| $r_8$ = | -38.6553 | $d_8$ = | 19.4149 | | | | |
| $r_9$ = | ∞ (Stop) | $d_9$ = | 4.2566 | | | | |
| $r_{10}$ = | 148.8077 | $d_{10}$ = | 2.9991 | $n_{d5}$ = | 1.74400 | $\nu_{d5}$ = | 44.78 |
| $r_{11}$ = | 20.2679 | $d_{11}$ = | 1.7977 | | | | |
| $r_{12}$ = | 24.3637 | $d_{12}$ = | 4.5157 | $n_{d6}$ = | 1.76182 | $\nu_{d6}$ = | 26.52 |
| $r_{13}$ = | 43.4439 | $d_{13}$ = | 2.5559 | | | | |
| $r_{14}$ = | 1817.9370 | $d_{14}$ = | 4.2645 | $n_{d7}$ = | 1.51633 | $\nu_{d7}$ = | 64.14 |
| $r_{15}$ = | -28.0245 | $d_{15}$ = | 21.1765 | | | | |
| $r_{16}$ = | -105.3265 | $d_{16}$ = | 2.0252 | $n_{d8}$ = | 1.69895 | $\nu_{d8}$ = | 30.13 |
| $r_{17}$ = | 44.0869 | $d_{17}$ = | 0.3433 | | | | |
| $r_{18}$ = | 46.2314 | $d_{18}$ = | 10.0009 | $n_{d9}$ = | 1.48749 | $\nu_{d9}$ = | 70.23 |
| $r_{19}$ = | -26.3979 | $d_{19}$ = | 1.9937 | | | | |
| $r_{20}$ = | 63.9817 | $d_{20}$ = | 4.2885 | $n_{d10}$ = | 1.51742 | $\nu_{d10}$ = | 52.43 |
| $r_{21}$ = | -173.5883 | $d_{21}$ = | 1.9994 | | | | |
| $r_{22}$ = | 1.605 × 10⁶ (DOE) | $d_{22}$ = | 0.0000 | $n_{d11}$ = | 1001 | $\nu_{d11}$ = | -3.45 |
| $r_{23}$ = | ∞ | $d_{23}$ = | 2.0000 | $n_{d12}$ = | 1.69400 | $\nu_{d12}$ = | 56.29 |
| $r_{24}$ = | ∞ | $d_{24}$ = | 1.5000 | | | | |
| $r_{25}$ = | ∞ | $d_{25}$ = | 18.5000 | $n_{d13}$ = | 1.51633 | $\nu_{d13}$ = | 64.14 |
| $r_{26}$ = | ∞ | $d_{26}$ = | 1.0000 | | | | |
| $r_{27}$ = | ∞ | $d_{27}$ = | 50.5000 | $n_{d14}$ = | 1.69680 | $\nu_{d14}$ = | 55.53 |
| $r_{28}$ = | ∞ | $d_{28}$ = | 1.4994 | | | | |
| IMG = | ∞ | | | | | | |

Aspherical Coefficients
22th surface

| | |
|---|---|
| K = | -1.0000 |
| $A_4$ = | -4.1789 × 10⁻¹⁰ |
| $A_6$ = | -4.0469 × 10⁻¹³ |
| $A_8$ = | 4.5702 × 10⁻¹⁵ |
| $A_{10}$ = | -7.4266 × 10⁻¹⁸ |
| $f_1$ = | -104.403 |
| $f_2$ = | 40.403 |
| $f_{DOE}$ = | 1605.060 |
| $f/f_{DOE}$ = | 0.0124 |
| $f_{DOE}/\nu_1$ = | -0.4171 |
| $f_{DOE}/\nu_2$ = | -0.0239 |
| $f/f_1$ = | -0.191 |
| $f/f_2$ = | 0.493 |
| $f_{1r}/f_{2f}$ = | -1.918 |

Example 5 f = 20.08897, $F_{NO}$ = 4.29, 2ω = 57.845°

| | | | | | | | |
|---|---|---|---|---|---|---|---|
| OBJ = | ∞ | $d_0$ = | ∞ | | | | |
| $r_1$ = | 99.4872 | $d_1$ = | 3.5215 | $n_{d1}$ = | 1.78590 | $\nu_{d1}$ = | 44.20 |
| $r_2$ = | 8668.3486 | $d_2$ = | 0.4329 | | | | |
| $r_3$ = | 57.6070 | $d_3$ = | 0.9722 | $n_{d2}$ = | 1.48749 | $\nu_{d2}$ = | 70.23 |
| $r_4$ = | 17.5453 | $d_4$ = | 6.6586 | | | | |
| $r_5$ = | -83.0836 | $d_5$ = | 1.0000 | $n_{d3}$ = | 1.71700 | $\nu_{d3}$ = | 47.92 |
| $r_6$ = | 29.2751 | $d_6$ = | 9.4332 | | | | |
| $r_7$ = | -709.6520 | $d_7$ = | 2.9624 | $n_{d4}$ = | 1.71700 | $\nu_{d4}$ = | 47.92 |
| $r_8$ = | -40.9467 | $d_8$ = | 26.0911 | | | | |
| $r_9$ = | ∞ (Stop) | $d_9$ = | 2.1833 | | | | |
| $r_{10}$ = | 441.2731 | $d_{10}$ = | 1.1848 | $n_{d5}$ = | 1.72000 | $\nu_{d5}$ = | 46.04 |
| $r_{11}$ = | 23.5649 | $d_{11}$ = | 2.7936 | | | | |
| $r_{12}$ = | 32.4575 | $d_{12}$ = | 4.7936 | $n_{d6}$ = | 1.72825 | $\nu_{d6}$ = | 28.46 |
| $r_{13}$ = | 219.4860 | $d_{13}$ = | 2.7003 | | | | |
| $r_{14}$ = | -136.4942 | $d_{14}$ = | 3.0558 | $n_{d7}$ = | 1.51633 | $\nu_{d7}$ = | 64.14 |

-continued

| | | | | | |
|---|---|---|---|---|---|
| $r_{15} =$ -24.8593 | $d_{15} =$ 20.4303 | | | | |
| $r_{16} =$ 132.5575 | $d_{16} =$ 9.9762 | $n_{d8} =$ | 1.48749 | $\nu_{d8} =$ | 70.23 |
| $r_{17} =$ -22.1073 | $d_{17} =$ 1.3989 | $n_{d9} =$ | 1.76200 | $\nu_{d9} =$ | 40.10 |
| $r_{18} =$ 51.8573 | $d_{18} =$ 0.4088 | | | | |
| $r_{19} =$ 53.4849 | $d_{19} =$ 12.2885 | $n_{d10} =$ | 1.48749 | $\nu_{d10} =$ | 70.23 |
| $r_{20} =$ -27.4506 | $d_{20} =$ 1.4997 | | | | |
| $r_{21} =$ 71.3748 | $d_{21} =$ 4.6880 | $n_{d11} =$ | 1.51823 | $\nu_{d11} =$ | 58.90 |
| $r_{22} =$ -140.8943 | $d_{22} =$ 1.4915 | | | | |
| $r_{23} =$ 1.902 × 10$^6$ (DOE) | $d_{23} =$ 0.0000 | $n_{d12} =$ | 1001 | $\nu_{d12} =$ | -3.45 |
| $r_{24} =$ ∞ | $d_{24} =$ 2.0000 | $n_{d13} =$ | 1.69400 | $\nu_{d13} =$ | 56.29 |
| $r_{25} =$ ∞ | $d_{25} =$ 1.5000 | | | | |
| $r_{26} =$ ∞ | $d_{26} =$ 18.5000 | $n_{d14} =$ | 1.51633 | $\nu_{d14} =$ | 64.14 |
| $r_{27} =$ ∞ | $d_{27} =$ 1.0000 | | | | |
| $r_{28} =$ ∞ | $d_{28} =$ 50.5000 | $n_{d15} =$ | 1.69680 | $\nu_{d15} =$ | 55.53 |
| $r_{29} =$ ∞ | $d_{29} =$ 1.4998 | | | | |
| IMG = ∞ | | | | | |

Aspherical Coefficients
23th surface $K =$ -1.0000
$A_4 =$ -3.3017 × 10$^{-10}$
$A_6 =$ 8.2694 × 10$^{-14}$
$A_8 =$ 7.9035 × 10$^{-16}$
$A_{10} =$ -1.2068 × 10$^{-18}$
$f_1 =$ -50.649
$f_2 =$ 43.115
$f_{DOE} =$ 1901.688
$f/f_{DOE} =$ 0.0106
$f_{DOE}/\nu_1 =$ -0.8463
$f_{DOE}/\nu_2 =$ 0.1273
$f/f_1 =$ -0.397
$f/f_2 =$ 0.466
$f_{1r}/f_{2f} =$ -1.748

Example 6

$f = 18.67301$, $F_{NO} = 4.00$, $2\omega = 61.458°$

| | | | | | |
|---|---|---|---|---|---|
| OBJ = ∞ | $d_0 =$ ∞ | | | | |
| $r_1 =$ 122.8593 | $d_1 =$ 4.2282 | $n_{d1} =$ | 1.48749 | $\nu_{d1} =$ | 70.23 |
| $r_2 =$ -262.3019 | $d_2 =$ 0.1067 | | | | |
| $r_3 =$ 81.1405 | $d_3 =$ 1.0000 | $n_{d2} =$ | 1.62041 | $\nu_{d2} =$ | 60.28 |
| $r_4 =$ 20.1059 | $d_4 =$ 36.8394 | | | | |
| $r_5 =$ 87.8922 | $d_5 =$ 1.7976 | $n_{d3} =$ | 1.62041 | $\nu_{d3} =$ | 60.28 |
| $r_6 =$ 20.0396 | $d_6 =$ 15.0224 | | | | |
| $r_7 =$ ∞ (Stop) | $d_7 =$ 2.7889 | | | | |
| $r_8 =$ -95.5350 | $d_8 =$ 5.1866 | $n_{d4} =$ | 1.62588 | $\nu_{d4} =$ | 35.70 |
| $r_9 =$ -25.2952 | $d_9 =$ 40.6150 | | | | |
| $r_{10} =$ 47.4412 | $d_{10} =$ 5.9983 | $n_{d5} =$ | 1.48749 | $\nu_{d5} =$ | 70.23 |
| $r_{11} =$ -71.9294 | $d_{11} =$ 1.0000 | | | | |
| $r_{12} =$ 103.7271 | $d_{12} =$ 1.4426 | $n_{d6} =$ | 1.76182 | $\nu_{d6} =$ | 26.52 |
| $r_{13} =$ 25.6401 | $d_{13} =$ 1.6215 | | | | |
| $r_{14} =$ 29.6071 | $d_{14} =$ 5.8680 | $n_{d7} =$ | 1.51742 | $\nu_{d7} =$ | 52.43 |
| $r_{15} =$ -76.4578 | $d_{15} =$ 1.7885 | | | | |
| $r_{16} =$ 1.415 × 10$^6$ (DOE) | $d_{16} =$ 0.0000 | $n_{d8} =$ | 1001 | $\nu_{d8} =$ | -3.45 |
| $r_{17} =$ ∞ | $d_{17} =$ 2.0000 | $n_{d9} =$ | 1.69400 | $\nu_{d9} =$ | 56.29 |
| $r_{18} =$ ∞ | $d_{18} =$ 1.2000 | | | | |
| $r_{19} =$ ∞ | $d_{19} =$ 18.5000 | $n_{d10} =$ | 1.51633 | $\nu_{d10} =$ | 64.14 |
| $r_{20} =$ ∞ | $d_{20} =$ 1.0000 | | | | |
| $r_{21} =$ ∞ | $d_{21} =$ 50.5000 | $n_{d11} =$ | 1.69680 | $\nu_{d11} =$ | 55.53 |
| $r_{22} =$ ∞ | $d_{22} =$ 1.4962 | | | | |
| IMG = ∞ | | | | | |

Aspherical Coefficients
16th surface $K =$ -1.0000
$A_4 =$ -3.3649 × 10$^{-10}$
$A_6 =$ 1.0673 × 10$^{-12}$
$A_8 =$ -4.2920 × 10$^{-15}$
$A_{10} =$ 2.1357 × 10$^{-17}$
$f_1 =$ -18.069
$f_2 =$ 46.268
$f_{DOE} =$ 1414.928
$f/f_{DOE} =$ 0.0132
$f_{DOE}/\nu_1 =$ -0.9798
$f_{DOE}/\nu_2 =$ 0.5375
$f/f_1 =$ -0.033

-continued

| | |
|---|---|
| $f/f_2 =$ | 0.404 |
| $f_{1r}/f_{2f} =$ | −0.791 |

Example 7

$f = 17.90360$, $F_{NO} = 2.8$, $2\omega = 63.597°$

| | | | | | | | |
|---|---|---|---|---|---|---|---|
| OBJ = | ∞ | $d_0 =$ | ∞ | | | | |
| $r_1 =$ | 96.3421 | $d_1 =$ | 10.0000 | $n_{d1} =$ | 1.48749 | $\nu_{d1} =$ | 70.23 |
| $r_2 =$ | −6242.3757 | $d_2 =$ | 4.0000 | | | | |
| $r_3 =$ | 66.8152 | $d_3 =$ | 4.0000 | $n_{d2} =$ | 1.62041 | $\nu_{d2} =$ | 60.28 |
| $r_4 =$ | 22.7627 | $d_4 =$ | 8.3857 | | | | |
| $r_5 =$ | −2437.7114 | $d_5 =$ | 1.2000 | $n_{d3} =$ | 1.62041 | $\nu_{d3} =$ | 60.28 |
| $r_6 =$ | 26.0886 | $d_6 =$ | 31.0120 | | | | |
| $r_7 =$ | 290.8099 | $d_7 =$ | 4.8634 | $n_{d4} =$ | 1.76182 | $\nu_{d4} =$ | 26.52 |
| $r_8 =$ | −71.7994 | $d_8 =$ | 18.0538 | | | | |
| $r_9 =$ | ∞ (Stop) | $d_9 =$ | 2.0102 | | | | |
| $r_{10} =$ | 31.9519 | $d_{10} =$ | 1.8011 | $n_{d5} =$ | 1.72000 | $\nu_{d5} =$ | 41.99 |
| $r_{11} =$ | 21.9036 | $d_{11} =$ | 17.0037 | | | | |
| $r_{12} =$ | 42.5728 | $d_{12} =$ | 13.3054 | $n_{d6} =$ | 1.48749 | $\nu_{d6} =$ | 70.23 |
| $r_{13} =$ | −45.4334 | $d_{13} =$ | 1.0010 | | | | |
| $r_{14} =$ | 47.3546 | $d_{14} =$ | 1.2000 | $n_{d7} =$ | 1.76182 | $\nu_{d7} =$ | 26.52 |
| $r_{15} =$ | 26.4927 | $d_{15} =$ | 1.9232 | | | | |
| $r_{16} =$ | 36.7707 | $d_{16} =$ | 6.3849 | $n_{d8} =$ | 1.48749 | $\nu_{d8} =$ | 70.23 |
| $r_{17} =$ | −61.1527 | $d_{17} =$ | 1.5000 | | | | |
| $r_{18} =$ | $1.699 \times 10^6$ (DOE) | $d_{18} =$ | 0.0000 | $n_{d9} =$ | 1001 | $\nu_{d9} =$ | −3.45 |
| $r_{19} =$ | ∞ | $d_{19} =$ | 2.0000 | $n_{d10} =$ | 1.69400 | $\nu_{d10} =$ | 56.29 |
| $r_{20} =$ | ∞ | $d_{20} =$ | 1.5015 | | | | |
| $r_{21} =$ | ∞ | $d_{21} =$ | 10.0000 | $n_{d11} =$ | 1.51633 | $\nu_{d11} =$ | 64.14 |
| $r_{22} =$ | ∞ | $d_{22} =$ | 1.0000 | | | | |
| $r_{23} =$ | ∞ | $d_{23} =$ | 50.0000 | $n_{d12} =$ | 1.58267 | $\nu_{d12} =$ | 46.42 |
| $r_{24} =$ | ∞ | $d_{24} =$ | 1.5167 | | | | |
| IMG = | ∞ | | | | | | |

Aspherical Coefficients
18th surface

| | |
|---|---|
| $K =$ | −1.0000 |
| $A_4 =$ | $-2.3963 \times 10^{-10}$ |
| $A_6 =$ | $1.1382 \times 10^{-13}$ |
| $A_8 =$ | $-6.2685 \times 10^{-17}$ |
| $A_{10} =$ | $1.2423 \times 10^{-17}$ |
| $f_1 =$ | −153.342 |
| $f_2 =$ | 40.311 |
| $f_{DOE} =$ | 1699.432 |
| $f/f_{DOE} =$ | 0.0105 |
| $f_{DOE}/\nu_1 =$ | −0.1996 |
| $f_{DOE}/\nu_2 =$ | 0.1657 |
| $f/f_1 =$ | −0.117 |
| $f/f_2 =$ | 0.444 |
| $f_{1r}/f_{2f} =$ | −0.727 |

Example 8

$f = 18.09953$, $F_{NO} = 2.8$, $2\omega = 63.040°$

| | | | | | | | |
|---|---|---|---|---|---|---|---|
| OBJ = | ∞ | $d_0 =$ | ∞ | | | | |
| $r_1 =$ | 148.2742 | $d_1 =$ | 6.0000 | $n_{d1} =$ | 1.48749 | $\nu_{d1} =$ | 70.23 |
| $r_2 =$ | −531.9848 | $d_2 =$ | 3.5000 | | | | |
| $r_3 =$ | 89.5725 | $d_3 =$ | 3.0000 | $n_{d2} =$ | 1.51633 | $\nu_{d2} =$ | 64.14 |
| $r_4 =$ | 24.4244 | $d_4 =$ | 7.1664 | | | | |
| $r_5 =$ | −554.3703 | $d_5 =$ | 3.5113 | $n_{d3} =$ | 1.62041 | $\nu_{d3} =$ | 60.28 |
| $r_6 =$ | 29.8152 | $d_6 =$ | 21.9833 | | | | |
| $r_7 =$ | −484.2359 | $d_7 =$ | 6.3650 | $n_{d4} =$ | 1.76182 | $\nu_{d4} =$ | 26.52 |
| $r_8 =$ | −63.0567 | $d_8 =$ | 35.5037 | | | | |
| $r_9 =$ | ∞ (Stop) | $d_9 =$ | 1.5000 | | | | |
| $r_{10} =$ | 47.6645 | $d_{10} =$ | 1.3000 | $n_{d5} =$ | 1.74950 | $\nu_{d5} =$ | 35.28 |
| $r_{11} =$ | 28.2495 | $d_{11} =$ | 3.2818 | | | | |
| $r_{12} =$ | −95.7621 | $d_{12} =$ | 6.9451 | $n_{d6} =$ | 1.78472 | $\nu_{d6} =$ | 25.68 |
| $r_{13} =$ | −72.9705 | $d_{13} =$ | 8.3344 | | | | |
| $r_{14} =$ | 44.3748 | $d_{14} =$ | 5.2658 | $n_{d7} =$ | 1.48749 | $\nu_{d7} =$ | 70.23 |
| $r_{15} =$ | −57.8329 | $d_{15} =$ | 11.4051 | | | | |
| $r_{16} =$ | 45.0036 | $d_{16} =$ | 1.5000 | $n_{d8} =$ | 1.76182 | $\nu_{d8} =$ | 26.52 |
| $r_{17} =$ | 27.9254 | $d_{17} =$ | 2.4529 | | | | |
| $r_{18} =$ | 39.9480 | $d_{18} =$ | 5.2851 | $n_{d9} =$ | 1.48749 | $\nu_{d9} =$ | 70.23 |
| $r_{19} =$ | −61.0752 | $d_{19} =$ | 1.2000 | | | | |
| $r_{20} =$ | $1.483 \times 10^6$ (DOE) | $d_{20} =$ | 0.0000 | $n_{d10} =$ | 1001 | $\nu_{d10} =$ | −3.45 |
| $r_{21} =$ | ∞ | $d_{21} =$ | 2.0000 | $n_{d11} =$ | 1.69400 | $\nu_{d11} =$ | 56.29 |
| $r_{22} =$ | ∞ | $d_{22} =$ | 1.5000 | | | | |
| $r_{23} =$ | ∞ | $d_{23} =$ | 10.0000 | $n_{d12} =$ | 1.51633 | $\nu_{d12} =$ | 64.14 |

-continued

| | | | |
|---|---|---|---|
| $r_{24} = \infty$ | $d_{24} = 1.0000$ | | |
| $r_{25} = \infty$ | $d_{25} = 50.0000$ | $n_{d13} = 1.58267$ | $\nu_{d13} = 46.42$ |
| $r_{26} = \infty$ | $d_{26} = 1.5000$ | | |
| IMG = $\infty$ | | | |

Aspherical Coefficients
20th surface $K = -1.0000$
$A_4 = -3.4883 \times 10^{-10}$
$A_6 = 1.1676 \times 10^{-12}$
$A_8 = -2.0480 \times 10^{-15}$
$A_{10} = 1.3357 \times 10^{-18}$
$f_1 = -76.708$
$f_2 = 40.640$
$f_{DOE} = 1482.680$
$f/f_{DOE} = 0.0122$
$f_{DOE}/\nu_1 = -0.2106$
$f_{DOE}/\nu_2 = -0.0086$
$f/f_1 = -0.236$
$f/f_2 = 0.445$
$f_{1r}/f_{2f} = -1.323$ As can be obvious from the foregoing, the present invention successfully provides an inexpensive phototaking lens system which makes sure of a long-enough back focus by using the diffractive optical element in the aforesaid arrangement, and which is well corrected for longitudinal chromatic aberration and chromatic aberration of magnification without recourse to any anomalous dispersion glass.

What I claim is:

1. A wide-angle lens system which comprises, in order from an object side of said wide-angle lens system, a front lens group comprising at least one positive lens and having negative power as a whole, an aperture stop, and a rear lens group comprising at least one negative lens and a diffractive optical element having a diffractive surface of positive power, and having positive power as a whole, and which satisfies condition (1) given below:

$$0.005 < f/f_{DOE} < 0.03 \tag{1}$$

where f is a focal length of said wide-angle lens system and $f_{DOE}$ is a focal length of said diffractive surface provided that $f_{DOE}$ is free of power of a substrate.

2. The wide-angle lens system according to claim 1, which satisfies condition (4) given below:

$$0.01 < f/f_{DOE} < 0.025 \tag{4}$$

3. The wide-angle lens system according to claim 1 or 2, which further satisfies conditions (2) and (3) given below:

$$-1.5 < f_{DOE}/\nu_1 < 0 \tag{2}$$

$$-0.5 < f_{DOE}/\nu_2 < 0.7 \tag{3}$$

where $\nu_1$ is an equivalent Abbe's number of said front lens group and $\nu_2$ is an equivalent Abbe's number of said rear lens group, provided that said equivalent Abbe's number is a function of a focal length and an Abbe's number of a refractive lens except said diffractive surface, as defined by:

$$1/\nu_i = \sum_j^n \{1/(\nu_{ij} f_{ij})\}$$

where $\nu_{ij}$ is an Abbe's number of a j-th lens in said i-th lens group and $f_{ij}$ is a focal length of the j-th lens in said i-th lens group.

4. The wide-angle lens system according to claim 1 or 2, which further satisfies conditions (5) and (6) given below:

$$-1.2 < f_{DOE}/\nu_1 < -0.1 \tag{5}$$

$$-0.3 < f_{DOE}/\nu_2 < 0.6 \tag{6}$$

where $\nu_1$ is an equivalent Abbe's number of said front lens group and $\nu_2$ is an equivalent Abbe's number of said rear lens group, provided that said equivalent Abbe's number is a function of a focal length and an Abbe's number of a refractive lens except said diffractive surface, as defined by:

$$1/\nu_i = \sum_j^n \{1/(\nu_{ij} f_{ij})\}$$

where $\nu_{ij}$ is an Abbe's number of a j-th lens in said i-th lens group and $f_{ij}$ is a focal length of the j-th lens in said i-th lens group.

5. The wide-angle lens system according to claim 4, which further satisfies condition (7) given below:

$$-0.3 < f_{DOE}/\nu_2 < 0.2 \tag{7}$$

6. The wide-angle lens system according to claim 1 or 2, which further satisfies conditions (8) and (9) given below:

$$-1.1 < f/f_1 < -0.1 \tag{8}$$

$$0.3 < f/f_2 < 0.7 \tag{9}$$

where $f_1$ is a focal length of said front lens group and $f_2$ is a focal length of said rear lens group.

7. The wide-angle lens system according to claim 3, which further satisfies conditions (8) and (9) given below:

$$-1.1 < f/f_1 < -0.1 \tag{8}$$

$$0.3 < f/f_2 < 0.7 \tag{9}$$

where $f_1$ is a focal length of said front lens group and $f_2$ is a focal length of said rear lens group.

8. The wide-angle lens system according to claim 6, which further satisfies condition (10) given below:

$$0.35 < f/f_2 < 0.55 \tag{10}$$

9. The wide-angle lens system according to claim 1 or 2, which further satisfies condition (11) given below:

$$-2.1 < f_{1r}/f_{2f} < -0.5 \qquad (11)$$

where $f_{1r}$ is a focal length of a lens located nearest to an image side of said front lens group and $f_{2f}$ is a focal length of a lens located nearest to an object side of said rear lens group.

10. The wide-angle lens system according to claim 3, which further satisfies condition (11) given below:

$$-2.1 < f_{1r}/f_{2f} < -0.5 \qquad (11)$$

where $f_{1r}$ is a focal length of a lens located nearest to an image side of said front lens group and $f_{2f}$ is a focal length of a lens located nearest to an object side of said rear lens group.

11. The wide-angle lens system according to claim 6, which further satisfies condition (11) given below:

$$-2.1 < f_{1r}/f_{2f} < -0.5 \qquad (11)$$

where $f_{1r}$ is a focal length of a lens located nearest to an image side of said front lens group and $f_{2f}$ is a focal length of a lens located nearest to an object side of said rear lens group.

12. An image pickup device using a wide-angle lens system as recited in claim 1 or 2 as a phototaking lens.

* * * * *